(12) United States Patent
Al-Dhahir et al.

(10) Patent No.: US 7,433,402 B2
(45) Date of Patent: *Oct. 7, 2008

(54) FINITE-LENGTH EQUALIZATION OVER MULTI-INPUT MULTI-OUTPUT (MIMO) CHANNELS

(75) Inventors: Naofal Al-Dhahir, Morristown, NJ (US); Ali H Sayed, Los Angles, CA (US)

(73) Assignee: AT&T Corp., New York, NY (US)

( * ) Notice: Subject to any disclaimer, the term of this patent is extended or adjusted under 35 U.S.C. 154(b) by 707 days.

This patent is subject to a terminal disclaimer.

(21) Appl. No.: 10/911,789

(22) Filed: Aug. 5, 2004

(65) Prior Publication Data

US 2005/0009486 A1    Jan. 13, 2005

Related U.S. Application Data

(63) Continuation of application No. 09/671,638, filed on Sep. 28, 2000, now Pat. No. 6,870,882.

(60) Provisional application No. 60/158,714, filed on Oct. 8, 1999.

(51) Int. Cl.
   *H03H 7/30*    (2006.01)
(52) U.S. Cl. .......................................... 375/233; 700/53
(58) Field of Classification Search .................. 375/233; 700/53
   See application file for complete search history.

(56) References Cited

U.S. PATENT DOCUMENTS 6,122,015 A * 9/2000 Al-Dhahir et al. ........... 348/614

OTHER PUBLICATIONS

Al-Dhahir, "MMSE decision-feedback equalizers: finite-length results", IEEE Transactions on Information Theory, vol. 41, Issue 4, Jul. 1995 pp. 961-975.*

J. Yang et al, "Joint Transmitter-Receiver Optimization for Multi-Input Multi-Output Systems with Decision Feedback," IEEE Transactions on Information Theory, vol. 40, No. 5, Sep. 1994, pp. 1334-1347.

A. Duel-Hallen, "A Family of Multiuser Decision-Feedback Detectors for Asynchronous Code-Division Multiple-Access Channels," IEEE Transactions on Communications, col. 43, No. 2/3/4, Feb./Mar./Apr. 1995, pp. 412-434.

A. Duel-Hallen, "Equalizers for Multiple Input/Multiple Output Channels and PAN Systems with Cyclostationary Sequences," IEEE Journal on Selected Areas in Communications, vol. 10, No. 3, Apr. 1992, pp. 630-639.

Naofal Al-Dhahir et al, "The Finite-Length Multi-Input Multi-Output MMSE-DFE," IEEE Transactions on Signal Processing, vol. 48, No. 10, Oct. 2000, pp. 2921-2936.

* cited by examiner

*Primary Examiner*—Mohammad Ghayour
*Assistant Examiner*—Juan A Torres
(74) *Attorney, Agent, or Firm*—Henry Brendzel

(57) ABSTRACT

A MIMO Decision Feedback Equalizer improves operation of a receiver by cancelling the spatio-temporal interference effects caused by the MIMO channel memory with a set of FIR filters in both the feedforward and the feedback MIMO filters. The coefficients of these FIR filters can be fashioned to provide a variety of controls by the designer.

20 Claims, 4 Drawing Sheets

FINITE-LENGTH EQUALIZATION OVER MULTI-INPUT MULTI-OUTPUT (MIMO) CHANNELS

RELATED APPLICATION

This is a continuation application of U.S. patent application Ser. No. 09/671,638 filed Sep. 28, 2000 now U.S. Pat. No. 6,870,882. This application claims priority from Provisional application No. 60/158,714, filed on Oct. 8, 1999. This application is also related to a Provisional application No. 60/158,713, also filed on Oct. 8, 1999.

BACKGROUND OF THE INVENTION

In multi-user communication over linear, dispersive, and noisy channels, the received signal is composed of the sum of several transmitted signals corrupted by inter-symbol interference, inter-user interference, and noise. Examples include TDMA (time division multiple access) digital cellular systems with multiple transmit/receive antennas, wide-band asynchronous CDMA (code division multiple access) systems, where inter-user interference is also known as is multiple access interference, wide-band transmission over digital subscriber lines (DSL) where inter-user interference takes the form of near-end and far-end crosstalk between adjacent twisted pairs, and in high-density digital magnetic recording where inter-user interference is due to interference from adjacent tracks.

Multi-user detection techniques for multi-input multi-output (MIMO) systems have been shown to offer significant performance advantages over single user detection techniques that treat inter-user interference as additive colored noise and lumps its effects with thermal noise. Recently, it has been shown that the presence of inter-symbol interference in these MIMO systems could enhance overall system capacity, provided that effective multi-user detection techniques are employed.

The optimum maximum likelihood sequence estimation (MLSE) receiver for MIMO channels was developed by S. Verdu, "Minimum Probability of Error for Asynchronous Gaussian Multiple Access Channels," *IEEE Transactions on Information Theory*, January 1986, pp. 85-96. However, its exponential complexity increases with the number of users, and channel memory makes its implementation costly for multi-user detection on severe-inter-symbol interference channels.

Two alternative transceiver structures have been recently proposed for MIMO dispersive channels as well. These structures, which are widely used in practice for single-input single-output dispersive channels, are the Discrete Multitone and minimum-mean-square-error decision feedback equalizer (MMSE-DFE). In the latter category, this includes A. Duel-Hallen "Equalizers for Multiple Input Multiple Output Channels and PAN Systems with Cyclostationary Input Sequences," *IEEE Journal on Selected Areas on Communications*, April 1992, pp. 630-639; A. Duel-Hallen "A Family of Multiuser Decision-Feedback Detectors for Asynchronous Code Division Multiple Access Channels," *IEEE Transactions on Communications*, February/March/April 1995, pp. 421-434; J. Yang et an "Joint Transmitter and Receiver Optimization for Multiple Input Multiple Output Systems with Decision Feedback," *IEEE Transactions on Information Theory*, September 1994, pp. 1334-1347; and J. Yang et al "On Joint Transmitter and Receiver Optimization for Multiple Input Multiple Output (MIMO) Transmission Systems," *IEEE Transactions on Communications*, December 1994, pp. 3221-3231. Alas, the prior art does not offer a practical MIMO MMSE-DFE receiver with feedforward and feedback FIR (finite impulse response) filters whose coefficients can be computed in a single computation (i.e., non-iteratively) in real-time under various MIMO detection scenarios.

SUMMARY

An advance in the art is realized with receiver having a multiple number of receiving antennas that feed a MIMO feedforward filter that is constructed from FIR filters with coefficients that are computed based on environment parameters that are designer-specified. Signals that are derived from a multiple-output feedback filter structure are subtracted from the signals from the multiple outputs of the feedforward filter structure, and the resulting difference signals are applied to a decision circuit. Given a transmission channel that is modeled as a set of FIR filters with memory $v$, a matrix W is computed for a feedforward filter that results in an effective transmission channel B with memory $N_b$, where $N_b \leq v$, where B is optimized so that $B_{opt} = \mathrm{argmin}_B \mathrm{trace}(R_{ee})$ subject to selected constraints; $R_{ee}$ being the error autocorrelation function. The feedback filter is modeled by $[I_{n_i} \ 0_{n_i \times n_i N_b}] - B^*$, where $n_i$ is the number of outputs in the feedforward filter, as well as the number of outputs in the feedback filter.

The coefficients of feedforward and the feedback filters, which are sensitive to a variety of constraints that can be specified by the designer, are computed by a processor in a non-iterative manner, only as often as it is expected for the channel characteristics to change.

DETAILED DESCRIPTION

Figure 1:
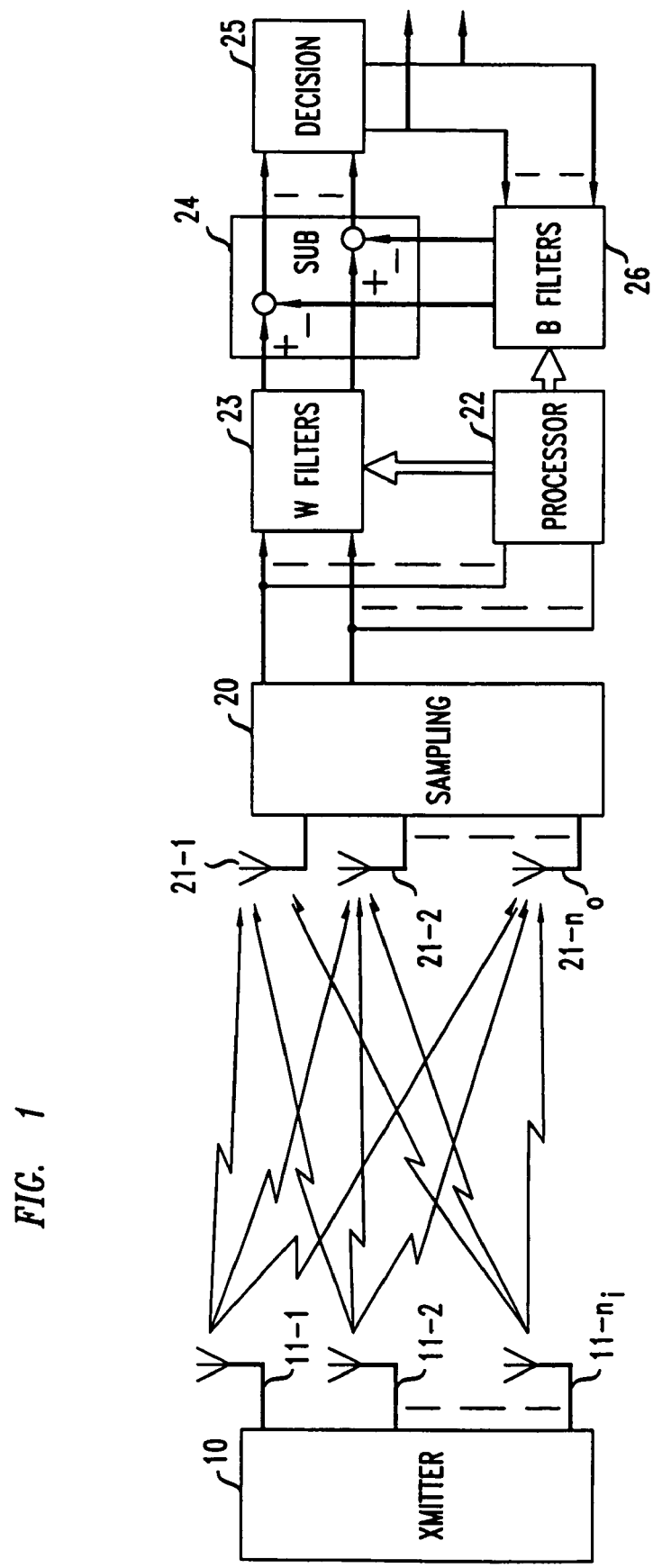
FIG. 1 shows the major elements of a receiver in accord with the principles disclosed herein.

FIG. 1 depicts the general case of an arrangement with $n_i$ transmitting antennas 11-1, 11-2, ... 11-$n_i$, that output signals (e.g., space-time encoded signals) to a transmission channel, and $n_o$ receiving antennas 21-1, 21-2, ... 21-$n_o$. Each transmitting antenna p outputs a complex-valued signal $x_p$, the signals of the $n_i$ antennas pass through a noisy transmission channel, and the $n_o$ receiving antennas capture the signals that passed through the transmission channel. The received signals are oversampled by a factor of l in element 20 and applied to feedforward W filters 23. Thus, the sampling clock at the output of element 20 is of period $T_s = T/I$, where T is the inter-symbol period at the transmitting antennas. The transmission channel's characterization is also referenced to $T_s$.

Filter bank 23 delivers an $n_i$ plurality of output signals ($n_i$ can equal $n_q$ for example) from which feedback signals are subtracted in circuit 24 and applied to decision circuits 25 (comprising conventional slicers). The outputs of decision circuits 25 are applied to feedback filters 26, which develop the feedback signals. Processor 22 develops the filter coefficients for the filters within elements 23 and 26 and installs the coefficients in the filters within these elements, as disclosed in detail below.

In the illustrative embodiment disclosed herein, the received signal is expressed by $$y_k^{(j)} = \sum_{i=1}^{n_i} \sum_{m=0}^{v^{(i,j)}} h_m^{(i,j)} x_{k-m}^{(i)} + n_k^{(j)}, \quad (1)$$

where $y_k^{(j)}$ is the signal at time k at the $j^{th}$ receiving antenna, $h_m^{(i,j)}$ is the $m^{th}$ coefficient (tap) in the channel impulse response between the $i^{th}$ transmitting antenna and the $j^{th}$ receiving antenna, and $n^{(j)}$ is the noise vector at the $j^{th}$ receiving antenna. The memory of the path (i.e., the largest value of m for which $h_m^{(i,j)}$ is not zero) is denoted by $v^{(i,j)}$.

It may be noted that it not unreasonable to assume, that the memory of the transmission channel is the same for all i,j links ($n_i \times n_o$ such links), in which case $v^{(i,j)} = v$. Alternatively, the $v^{(i,j)}$ limit in equation (1) can be set to that v which corresponds to maximum length of all of the $n_i \times n_o$ channel input responses, i.e., $v = \max_{i,j} v^{(i,j)}$. It may also be noted that all of the variables in equation (1) are actually l×1 column vectors, corresponding to the l time samples per symbol in the oversampled FIG. 1 arrangement.

By grouping the received samples from all $n_o$ antennas at symbol time k into an $n_o l \times 1$ column vector $y_k$, one can relate $y_k$ to the corresponding $n_i \times 1$ (column) vector of input samples as follows $$y_k = \sum_{m=0}^{v} H_m x_{k-m} + n_k, \quad (2)$$

where $H_m$ is the MIMO channel coefficients matrix of size $n_o l \times n_i$, $x_{k-m}$ is a size $n_i \times 1$ input (column) vector, and $n_k$ is a size $n_o l \times 1$ vector.

Over a block of $N_f$ symbol periods, equation (2) can be expressed in matrix notation as follows:

$$\begin{bmatrix} y_{k+N_f-1} \\ y_{k+N_f-2} \\ \vdots \\ y_k \end{bmatrix} = \begin{bmatrix} H_0 & H_1 & \ldots & H_v & 0 & \ldots & 0 \\ 0 & H_0 & H_1 & \ldots & H_v & 0 & \ldots \\ \vdots & \vdots & \vdots & \vdots & \vdots & \ddots & \vdots \\ 0 & \ldots & 0 & H_0 & H_1 & \ldots & H_v \end{bmatrix} \begin{bmatrix} x_{k+N_f-1} \\ x_{k+N_f-2} \\ \vdots \\ x_{k-v} \end{bmatrix} + \begin{bmatrix} n_{k+N_f-1} \\ n_{k+N_f-2} \\ \vdots \\ n_k \end{bmatrix} \quad (3)$$

or, more compactly, $$y_{k+N_f-1:k} = H x_{k+N_f-1:k-v} + n_{k+N_f-1:k}. \quad (4)$$

The subscripts in equation (4) indicate a range. For example $k+N_f-1:k$ means the range from $k+N_f-1$ to k, inclusively.

It is useful to define the following correlation matrices:

$$R_{xy} = E[x_{k+N_f-1:k-v} y^*_{k+N_f-1:k}] = R_{xx} H^* \quad (5)$$

$$R_{yy} = E[y_{k+N_f-1:k} y^*_{k+N_f-1:k}] = H R_{xx} H^* + R_{nn}, \quad (6)$$

$$R_{xx} = E[x_{k+N_f-1:k-v} x^*_{k+N_f-1:k-v}] \text{ and} \quad (7)$$

$$R_{nn} = E[n_{k+N_f-1:k} n^*_{k+N_f-1:k}], \quad (8)$$

and it is assumed that these correlation matrices do not change significantly in time or, at least, do not change significantly over a time interval that corresponds to a TDMA burst (assumed to be much shorter than the channel coherence time), which is much longer than the length of the FIR filters in element 23 (in symbol periods denoted by $N_f$). Accordingly, a re-computation within processor 22 of the above matrices, and the other parameters disclosed herein, leading to the computation of the various filter coefficients, need not take place more often than once every TDMA burst. Once H, $R_{xx}$ and $R_{nn}$ are ascertained (through the conventional use of training sequences), $R_{xy}$ and $R_{yy}$ are computed by $R_{xx} H^*$ and $H R_{xx} H^* + R_{nn}$, respectively.

Figure 2:
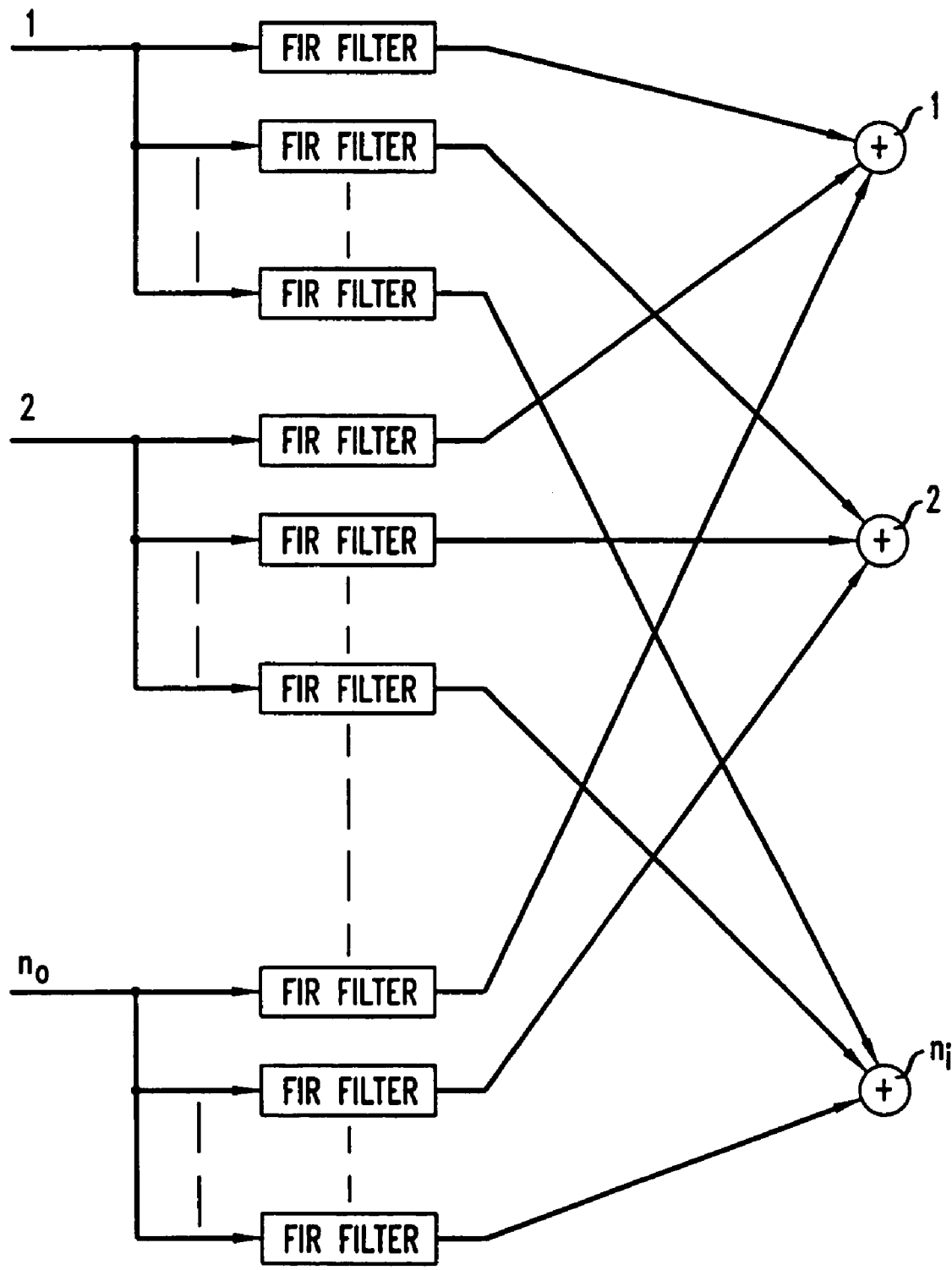
FIG. 2 presents the structure of elements 23 and 26, although element 26 differs in size from element 23, in that element 23 has $n_o$ number of inputs and $n_o \times n_i$ filters, whereas element 26 has $n_i$ number of inputs and $n_i \times n_i$ filters.

In accordance with the principles disclosed herein, element 23 comprises a collection of FIR filters that are interconnected as shown in FIG. 2, and the impulse response coefficients of element 23 can be expressed by $W^* \equiv [W^*_0 W^*_1 \ldots W^*_{N_f-1}]$, each having $N_f$ matrix taps $W_i$, of size ($l n_o \times n_i$). That is, $W_i$ has the form:

$$W_i = \begin{bmatrix} w_i^{(1,1)} & \ldots & w_i^{(1,n_i)} \\ \vdots & \ldots & \vdots \\ w_i^{(n_a,1)} & \ldots & w_i^{(n_a,n_i)} \end{bmatrix} \quad (9)$$

where each entry in $W_j^{(p,q)}$ is an l×1 vector corresponding to the l output samples per symbol. Stated in other words, the matrix $W_0$ specifies the $0^{th}$ tap of the set of filters within element 23, the matrix $W_1$ specifies the $1^{st}$ tap of the set of filters within element 23, etc.

Also in accordance with the principles disclosed herein, element 26 comprises a collection of FIR filters that also are interconnected as shown in FIG. 2, and the impulse response coefficients of element 26 is chosen to be equal to $$[I_{n_i} \; 0_{n_i \times n_i N_b}] - B^* \equiv [(I_{n_i} - B^*_0) B^*_1 \ldots B^*_{N_b}], \quad (10)$$

where $B^*$ is expressed by $B^* \equiv [B^*_0 B^*_1 \ldots B^*_{N_b}]$, with ($N_b+1$) matrix taps $B_i$, each of size $n_i \times n_i$. That is, $B_i$ has the form:

$$B_i = \begin{bmatrix} b_i^{(1,1)} & \ldots & b_i^{(1,n_j)} \\ \vdots & \ldots & \vdots \\ b_i^{(n_i,1)} & \ldots & b_i^{(n_i,n_i)} \end{bmatrix}. \quad (11)$$

Stated in other words, $B_0$ specifies the $0^{th}$ tap of the set of filters within element 26, the matrix $B_1$ specifies the $1^{st}$ tap of the set of filters within element 26, etc.

Defining $\tilde{B}^* \equiv [0_{n_i \times n_i \Delta_b} B^*]$, where $\tilde{B}^*$ is a matrix of size $n_i \times n_i (N_f+v)$, the value of $N_b$ is related to the decision delay by the equality $(\Delta + N_b + 1) = (N_f + v)$.

The error vector at time k is given by $$E_k = \tilde{B}^* x_{k+N_f-1:k-v} - W^* y_{k+N_f-1:k}. \quad (12)$$

Therefore, the $n_i \times n_i$ error auto-correlation matrix is $$R_{\theta\theta} \equiv E[E_k^* E_k] \quad (13)$$

-continued $$= \tilde{B}^* R_{xx} \tilde{B} - \tilde{B}^* R_{xy} W - W^* R_{yx} \tilde{B} + W^* R_{yy} W$$

$$= \tilde{B}^* (R_{xx} - R_{xy} R_{yy}^{-1} R_{yx}) \tilde{B} + (W^* - \tilde{B}^* R_{xy} R_{yy}^{-1}) R_{yy} (W^* - \tilde{B}^* R_{xy} R_{yy}^{-1})$$

$$= \tilde{B}^* R^{\perp} \tilde{B} + G^* R_{yy} G$$

Using the Orthogonality Principle, which states that $E[E_k y^*_{k+N_f-tk}]=0$, it can be shown that the optimum matrix feedforward and feedback filters are related by $$W^*_{opt} = \tilde{B}^*_{opt} R_{xy} R_{yy}^{-1} \quad (14)$$
$$= \tilde{B}^*_{opt} R_{xx} H^* (H R_{xx} H^* + R_{nn})^{-1}$$
$$= \tilde{B}^*_{opt} (R_{xx}^{-1} + H^* R_{nn}^{-1} H)^{-1} H^* R_{nn}^{-1},$$

and the $n_i \times n_i$ auto-correlation matrix $R_{ee}$ is $$R_{\theta\theta} \equiv E[E_k E_k^*] \quad (15)$$
$$= \tilde{B}^* (R_{xx} - R_{xy} R_{yy}^{-1} R_{yx}) \tilde{B}$$
$$= \tilde{B}^* R^{\perp} \tilde{B}$$
$$= \tilde{B}^* (R_{xx} - R_{xx} H^* (H R_{xx} H^* + R_{nn})^{-1} H R_{xx}) \tilde{B}$$
$$= \tilde{B}^* (R_{xx}^{-1} + H^* R_{nn}^{-1} H)^{-1} \tilde{B}.$$

$R_{ee}$ can also be expressed as $R_{ee}=B^* R^{-1} B$, where $R=R_{xx}^{-1}+H^* R_{nn}^{-1} H$.

It remains to optimize values for the B matrix and the W matrix such that, in response to specified conditions, the trace (or determinant) of $R_{ee}$ is minimized. The following discloses three approaches to such optimization.

Scenario 1

In this scenario, it is chosen to process only previous receiver decisions. These decisions relate to different users that concurrently have transmitted information that has been captured by antennas $21\text{-}1\text{-}21\text{-}n_o$ and detected in circuit 25. That means that feedback element 26 uses only delayed information and that the $0^{th}$ order coefficients of the filters within element 26 have the value 0. Therefore, in light of the definition expressed in equation (10), this scenario imposes the constraint of $B_0 = I_{n_f}$.

To determine the optimum matrix feedback filter coefficients under this constraint, the following optimization problem needs to be solved:

$$\min_{\tilde{B}} R_{ee} = \min_{\tilde{B}} \tilde{B}^* R^{-1} \tilde{B}, \text{ subject to } \tilde{B}^* \Phi = C^*, \quad (16)$$

where $$\Phi \equiv \begin{bmatrix} I_{n_i} & 0 & \cdots & 0 \\ 0 & I_{n_i} & \vdots & \vdots \\ \vdots & 0 & \ddots & I_{n_i} \\ 0 & \cdots & \cdots & 0 \end{bmatrix} \text{ and } C^* = [\, 0_{n_i \times n_i \Delta} \quad I_{n_i} \,] \quad (17)$$

It can be shown that the solution to the above is given by $$\tilde{B}_{opt} = R\Phi(\Phi^* R \Phi)^{-1} C, \quad (18)$$

resulting in the error signal $$R_{ee,min} = C^* (\Phi^* R \Phi)^{-1} C. \quad (19)$$

If we define the partitioning $$R \equiv \begin{bmatrix} R_{11} & R_{12} \\ R_{12}^* & R_{22} \end{bmatrix}, \quad (20)$$

where $R_{11}$ is of size $n_i(\Delta+1) \times n_i(\Delta+1)$, then $$\tilde{B}_{opt} = \begin{bmatrix} R_{11} \\ R_{12}^* \end{bmatrix} R_{11}^{-1} C = \begin{bmatrix} I_{n_i(\Delta+1)} \\ R_{12}^* R_{11}^{-1} \end{bmatrix} C \quad (21)$$

and $$R_{ee,min} = C^* R_{11}^{-1} C, \quad (22)$$

where the delay parameter $\Delta$ is adjusted to minimize the trace (or determinant) of $R_{ee,min}$. Once $B_{opt}$ is known, equation (14) is applied to develop $W^*_{opt}$.

Figure 3:
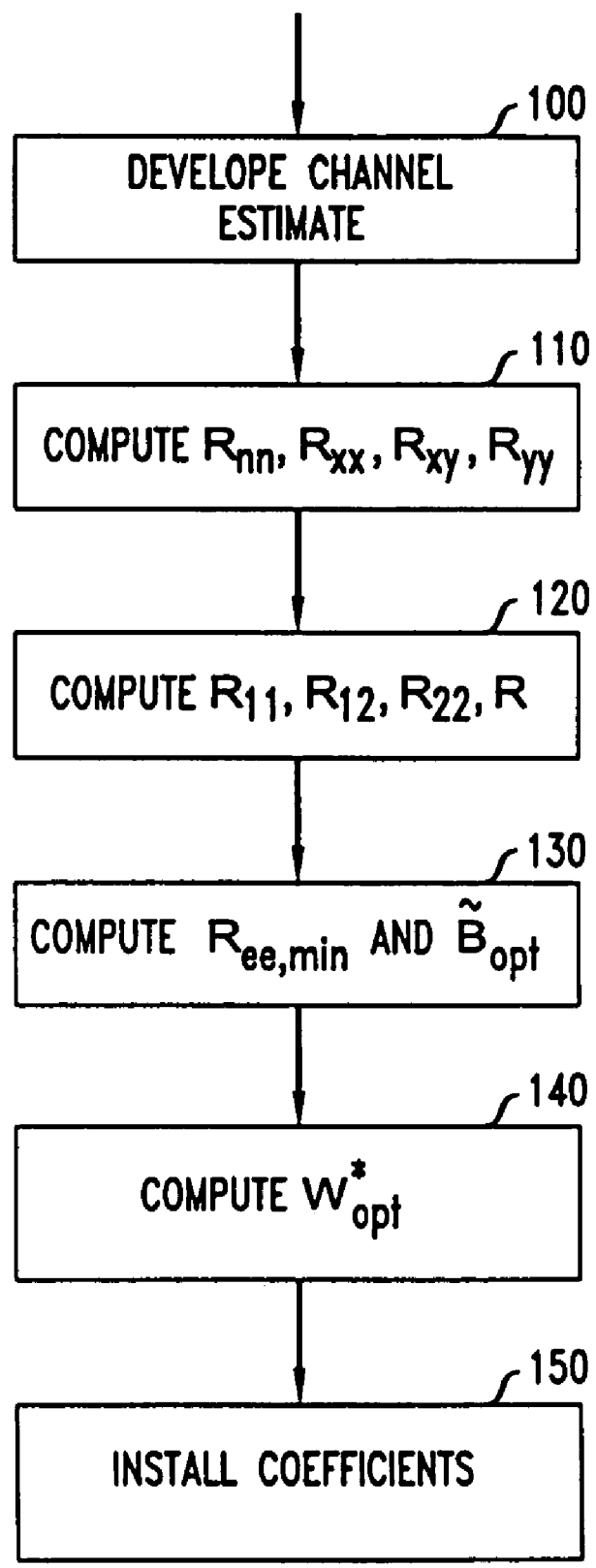
FIG. 3 is a flowchart describing one method carried out by processor 22.

FIG. 3 presents a flowchart for carrying out the method of determining the filter coefficients that processor 22 computes pursuant to scenario 1. Step 100 develops an estimate of the MIMO channel between the input points and the output point of the actual transmission channel. This is accomplished in a conventional manner through the use of training sequences. The estimate of the MIMO channel can be chosen to be limited to a given memory length, ν, or can be allowed to include as much memory as necessary to reach a selected estimate error level. That, in turn, depends on the environment and is basically equal to the delay spread divided by $T_s$.

Following step 100, step 110 determines the matrices, $R_{nn}$, $R_{xx}$, $R_{xy}$, and $R_{yy}$. The matrix $R_{nn}$ is computed by first computing n=y−Hx and then computing the expected value $E[n^*n]$—see equation (8) above. The matrix $R_{xx}$ is computed from the known training sequences—see equation (7) above—(or is precomputed and installed in processor 22). In may be noted that for uncorrelated inputs, $R_{xx}$=I. The matrices $R_{xy}$ and $R_{yy}$ are computed from the known training sequences and the received signal or directly from H and $R_{nn}$—see equations (5) and (6) above.

Following step 110, step 120 computes $R=R_{xx}^{-1}-H^* R_{nn}^{-1} H$, and the partition components, $R_{11}$, $R_{12}$, and $R_{22}$, as per equation (20). Following step 120, step 130 computes $R_{ee,min}$ from equation (22) and adjusts $\Delta$ to minimize the trace (or determinant) of $R_{ee,min}$, computes $B_{opt}$ from equation (21), and from $B_{opt}$ determines the coefficients of the $n_i \times n_i$ filters of element 26, pursuant to equation (10). Step 140 computes $W^*_{opt}$ from equation (14), and finally, step 150 installs the coefficients developed in step 130 into the filters of element 26 and the coefficients developed in step 140 into the filters of element 23.

A second approach for computing $B_{opt}$ utilizes the block Cholesky factorization (which is a technique that is well known in the art):

$$R \equiv R_{xx}^{-1} + H^* R_{nn}^{-1} H \quad (22)$$
$$= \begin{bmatrix} L_1 & 0 \\ L_2 & L_3 \end{bmatrix} \begin{bmatrix} D_1 & 0 \\ 0 & D_2 \end{bmatrix} \begin{bmatrix} L_1^* & L_2^* \\ 0 & L_3^* \end{bmatrix}$$

-continued
$$\equiv LDL^*,$$

where $L_1$ is of size $n_i(\Delta+1) \times n_i(\Delta+1)$. Using the result in equations (18) and (19) yields $$\tilde{B}_{opt} = \begin{bmatrix} I_{n_i(\Delta+1)} \\ L_2 L_1^{-1} \end{bmatrix} C = \begin{bmatrix} I_{n_i} \\ L_2 L_1^{-1} C \end{bmatrix} \quad (23)$$

$$= L[e_{n_i \Delta_{opt}} \cdots e_{n_i(\Delta_{opt}+1)-1}]$$

and $$R_{\theta\theta,min} = C^* D_1^{-1} C \quad (24)$$

$$= \text{diag}(d_{n_i \Delta_{opt}}^{-1}, \ldots, d_{n_i(\Delta_{opt}+1)-1}^{-1}),$$

where the index $\Delta_{opt}$ is chosen (as before) to minimize the trace and determinant of $R_{ee,min}$. Using equation (23), equation (14) can be expressed as follows $$W_{opt}^* = \tilde{B}_{opt}^* R_{xx} H^* (H R_{xx} H^* + R_{nn})^{-1} \quad (25)$$

$$= \tilde{B}_{opt}^* (R_{xx}^{-1} + H^* R_{nn}^{-1} H)^{-1} H^* R_{nn}^{-1}$$

$$= \begin{bmatrix} d_{n_i \Delta_{opt}}^{-1} \theta_{n_i \Delta_{opt}}^* \\ \vdots \\ d_{n_i(\Delta_{opt}+1)-1}^{-1} \theta_{n_i(\Delta_{opt}+1)-1}^* \end{bmatrix} L^{-1} H^* R_{nn}^{-1}$$

Yet a third approach for computing $B_{opt}$, and $R_{ee,min}$ defines $B^* = [C^* \ \bar{B}^*]$ and partitions $R^\perp$ into as $$\begin{bmatrix} R_{11}^\perp & R_{12}^\perp \\ R_{12}^{\perp *} & R_{22}^\perp \end{bmatrix},$$

where $$R_{11}^\perp$$

is of size $n_i(\Delta+1) \times n_i(\Delta+1)$, to yield $$R_{\theta\theta} = \tilde{B}^* R^\perp \tilde{B} \quad (26)$$

$$\equiv [C^* \ \bar{B}^*] \begin{bmatrix} R_{11}^\perp & R_{12}^\perp \\ R_{12}^{\perp *} & R_{22}^\perp \end{bmatrix} \begin{bmatrix} C \\ B \end{bmatrix}$$

$$\equiv [I_{n_i} \ \bar{B}^*] \begin{bmatrix} \bar{R}_{11}^\perp & \bar{R}_{12}^\perp \\ \bar{R}_{12}^{\perp *} & R_{22}^\perp \end{bmatrix} \begin{bmatrix} I_{n_i} \\ \bar{B} \end{bmatrix}$$

$$= (\bar{R}_{11}^\perp - \bar{R}_{12}^\perp (R_{22}^\perp)^{-1} \bar{R}_{12}^{\perp *}) + (\bar{B}^* + \bar{R}_{12}^\perp (R_{22}^\perp)^{-1})R_{22}^\perp$$

-continued
$$(\bar{B}^* + \bar{R}_{12}^\perp (R_{22}^\perp)^{-1})^*,$$

where $$\bar{R}_{11}^\perp \equiv C^* R_{11}^\perp C \text{ and } \bar{R}_{12}^\perp = C^* R_{12}^\perp.$$

Therefore, $$B_{opt} = -\bar{R}_{12}^\perp (R_{22}^\perp)^{-1}$$

$$W_{opt}^* = [0_{n_i \times n_i \Delta} \ I_{n_i} - \bar{R}_{12}^\perp (R_{22}^\perp)^{-1}](R_{xx} H^* (H R_{xx} H^* + R_{nn})^{-1} \quad (27)$$

$$R_{\theta\theta,min} = \bar{R}_{11}^\perp - \bar{R}_{12}^\perp (R_{22}^\perp)^{-1} \bar{R}_{12}^{\perp *} \quad (28)$$

Scenario 2

In this scenario it is assumed that users whose signals are received by the FIG. 1 receiver are ordered so that lower-indexed users are detected first, and current decisions from lower-indexed users are used by higher-indexed users in making their decisions, i.e., $B_0$ is a lower-triangular matrix. The general results of equations (21) and (22) can be applied by setting $C^* = [0_{n_i \times n_i \Delta} \ B^*_0]$ where $B_0$ is an $n_i \times n_i$ monic lower-triangular matrix whose entries are optimized to minimize trace($R_{ee,min}$). To this end, a partitioning can be defined where $$R_{11}^{-1} \equiv \begin{bmatrix} R_1 & R_2 \\ R_2^* & R_3 \end{bmatrix}, \quad (29)$$

$R_{11}$ being the term corresponding to $R_{11}$ of equation (20), with $R_1$ being of size $n_i \Delta \times n_i \Delta$, and $R_3$ being of size $n_i \times n_i$. Equation (22) simplifies to $$R_{ee,min} = B^*_0 R_3 B_0 \quad (30)$$

It can be shown that, the optimum monic lower-triangular $B_0$ that minimizes trace($R_{ee,min}$) is given by the nomic lower-triangular Cholesky factor of $R_3^{-1}$, i.e., $$R_3^{-1} = L_3 D_3 L^*_3, \quad (31)$$

which yields $$B_0^{opt} = L_3, \quad (32)$$

and $$R_{ee,min} = D_3^{-1}. \quad (33)$$

The result is that $$\tilde{B}_{opt} = \begin{bmatrix} I_{n_i(\Delta+1)} \\ R_{12}^* R_{11}^{-1} \end{bmatrix} C,$$

as expressed in equation (21), with the modified value of $R_{11}^{-1}$, and with $$C^* = [0_{n_i \times n_i \Delta} \ B^*_0]. \quad (34)$$

A second approach for computing the optimum FIR filter coefficients for the FIG. 1 receiver involves computing a standard—rather than a block—Cholesky factorization of the matrix $R=R_{xx}^{-1}+H^*R_{nn}^{-1}H$ (see the definition following equation (15)) in the form LDL*. Then, the coefficients of the element 23 filters is given by the $n_i$ adjacent columns of L that correspond to a diagonal matrix with the smallest trace. Therefore, equations (23) and (25) are used to compute the corresponding coefficients, with the understanding that L is now a lower-triangular matrix, rather than a block lower-triangular matrix. The equivalence of the two approaches can be shown using the nesting property of Cholesky factorization.

Figure 4:
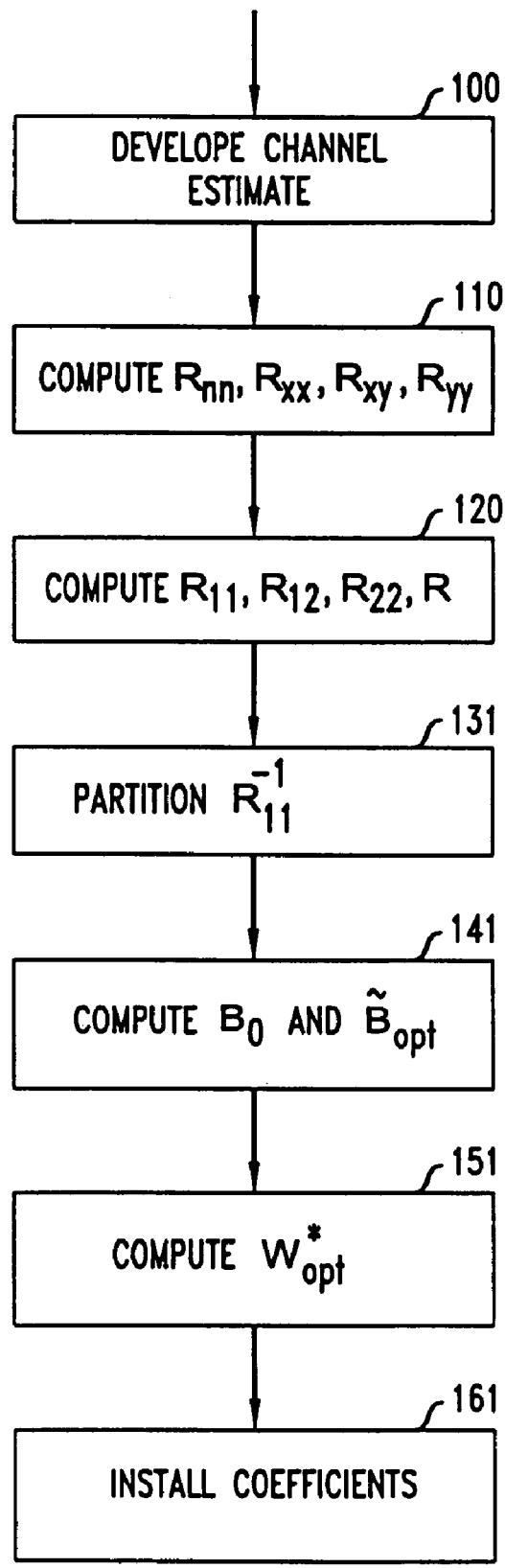
FIG. 4 is a flowchart describing another method carried out by processor 22.

FIG. 4 presents a flowchart for carrying out the method of determining the filter coefficients that processor 22 computes pursuant to scenario 2. Steps 100 through 120 are the same as in FIG. 3, but the method diverges somewhat in the following steps. In step 131 the partition according to equation (20) is developed for a $\Delta$ that minimizes $R_{ee,min}$ of equation (33), and control passes to step 141, where $B_0^{opt}$ is computed based on equations (31) and (32), followed by a computation of $B_{opt}$ based on equations (21) and (34). Following step 141, step 151 computes $W^*_{opt}$ from equation (14), and finally, step 161 installs the coefficients developed in step 141 into the filters of element 26 and the coefficients developed in step 151 into the filters of element 23.

Scenario 3

When multistage detectors are employed, current decisions from all other users, obtained from a previous detection stage, are available to the user of interest. Therefore, suppressing their interfering effects would improve the performance of the receiver. This detection scenario has the same mathematical formulation as scenarios 1 and 2, except that $B_0$ is now constrained only to be monic, i.e., $e^*_i B_0 e_i = 1$ for all $0 \le i \le n_i - 1$. The general results in equations (21) and (22) still apply with $C^* = [0_{n_i \times n_i \Delta} B^*_0]$ where $B_0$ is optimized to minimize trace($R_{ee,min}$). In short, under scenario 3, the following optimization problem is solved:

$$\min_{B_0} \mathrm{trace}(B_0^* R_3 B_0) \text{ subject to } e_i^* B_0 e_i = 1 \text{ for all } 0 \le i \le n_i - 1, \quad (33)$$

where $R_3$ is as defined in equation (29). Using Lagrange multiplier techniques, it can be shown that the optimum monic $B_0$ and the corresponding MMSE are given by $$B_0^{opt} = \frac{R_3^{-1} e_{i-1}}{e_i^* R_3^{-1} e_i}; \quad 0 \le i \le n_i - 1. \quad (34)$$

Thus, the method of determining the filter coefficients that processor 22 computes pursuant to scenario 3 is the same as the method depicted in FIG. 4, except that the computation of $B_0^{opt}$ within step 141 follows the dictates of equation (34).

With the above analysis in mind, a design of the filter coefficients of the filters within elements 23 and 26 can proceed for any given set of system parameters, which includes:

MIMO channel memory between the input points and the output point of the actual transmission channel, $v$, The number of pre-filter taps chosen, $N_f$, The shortened MIMO memory, $N_b$, The number of inputs to the transmission channel, $n_i$, The number of output derived from the transmission channel, $n_o$, The autocorrelation matrix of the inputs, $R_{xx}$, The autocorrelation matrix of the noise, $R_{nn}$, The oversampling used, $l$, and The decision delay, $\Delta$.

It should be understood that a number of aspects of the above disclosure are merely illustrative, and that persons skilled in the art may make various modifications that, nevertheless, are within the spirit and scope of this invention.

What is claimed is:

1. A receiver responsive to an $n_o$ plurality of entry points comprising:
   a feedforward filter structure having an $n_o \times n_i$ plurality of FIR filters where $n_i$ is an integer greater than 1 and that is not restricted to equal $n_o$, each responsive to a signal that comprises blocks of $N_f$ symbols each, that is derived from one of said $n_o$ entry points and each developing an output signal that contributes to one of $n_i$ feedforward filter structure outputs, with each of said FIR filters in said feedforward filter structure having $N_f$ filter taps;
   a feedback filter structure developing $n_i$ feedback signals, the structure having an $n_o \times n_i$ plurality of FIR filters, each being responsive to one of $n_i$ receiver output signals;
   a subtractor structure that develops $n_i$ signals from signals of said $n_i$ feedforward filter structure outputs and said $n_i$ feedback signals; and
   decision logic responsive to said $n_i$ signals developed by said subtractor structure, for developing said $n_i$ receiver output signals.

2. The receiver of claim 1 further comprising a sampling circuit interposed between said $n_o$ plurality of entry points and said feedforward filter structure that samples received signal at rate $$T_s = \frac{T}{l},$$

where $l$ is an integer and $T$ is symbol rate of a transmitter whose signals said receiver receives.

3. The receiver of claim 2 where $l>1$.

4. The receiver of claim 2 where said plurality of FIR filters in said feedforward structure is expressed by matrix W, and W is computed by $$W^*_{opt} = \tilde{B}^*_{opt} R_{xy} R_{yy}^{-1},$$

$$W^*_{opt} = \tilde{B}^*_{opt} R_{xx} H^* (H R_{xx} H^* + R_{nn})^{-1}, \text{ or}$$

$$W^*_{opt} = \tilde{B}^*_{opt} (R_{xx}^{-1} + H^* R_{nn}^{-1} H)^{-1} H^* R_{nn}^{-1},$$

where $R_{xx}$ is an autocorrelation matrix of a block of signals transmitted by a plurality of transmitting antennas to said $n_o$ antennas via a channel having a transfer characteristic H, $R_{nn}$ is an autocorrelation matrix of noise received by said plurality of $n_o$ antennas during said block of signals transmitted by said transmitting antennas, $R_{xy}=R_{xx}H^*$, $R_{yy}=HR_{xx}H^*+R_{nn}$, and $\tilde{B}^*_{opt}$ is a sub-matrix of matrix $B^*_{opt}$, where $B_{opt} = \mathrm{argmin}_B \mathrm{trace}(R_{ee})$ subject to a selected constraint, $R_{ee}$ being the error autocorrelation function.

5. The receiver of claim 4 where said plurality of FIR filters in said feedback structure is expressed by matrix $[I_{n_i} 0_{n_i \times n_i N_b}] - B^*$.

6. The receiver of claim 4 wherein said plurality of FIR filters in said feedback filter structure and in said feedforward filter structure are subjected to designer constraints relative to any one or a number of members of the following set: transmission channel memory, size of said block, effective memory of the combination consisting of said transmission channel; $n_i$, $n_o$, autocorrelation matrix $R_{xx}$, autocorrelation matrix $R_{nn}$, value of factor l in said sampling circuit, and decision delay.

7. The receiver of claim 4 where said matrix W is expressible by $W \equiv [W_0 \ W_1 \ \ldots \ W_{N_f-1}]^t$, where matrix $W_q$ is a matrix that specifies $q^{th}$ tap coefficients of said FIR filters included in said feedforward filter structure.

8. The receiver of claim 1 where further including a processor coupled to signals applied to said feedforward filter structure, for computing coefficients of said FIR filters included in said feedforward filter structure and of said FIR filters included in said feedback filter structure.

9. The receiver of claim 8 where coefficients are computed in said processor in response to a block of $N_f$ symbols.

10. The receiver of claim 8 where said coefficients are computed in a non-iterative manner.

11. The receiver of claim 8 where said coefficients are computed with a non-iterative equation.

12. The receiver of claim 8 where said coefficients are computed once every time interval that is related to rapidity of change in characteristics of transmission medium preceding said entry points.

13. The receiver of claim 12 where said processor installs computed coefficients of said FIR filters included in said feedforward filter structure and of said FIR filters included in said feedback filter structure in said FIR filters included in said feedforward filter structure and of said FIR filters included in said feedback filter structure following each computation.

14. The receiver of claim 1 where said FIR filters in said feedforward filter structure form an array of filters that includes one FIR filter connected between each of said $n_o$ input points and said $n_i$ outputs.

15. The receiver of claim 14 where said entry points are antennas and said $n_o$ plurality of antennas receive signals, via a transmission channel, from a transmitter having a multiple number of transmitting antennas.

16. The receiver of claim 15 where said transmitter has $n_i$ transmitting antennas.

17. The receiver of claim 1 where coefficients of the FIR filters in said feedforward filter are set to results in an effective transmission channel B with memory $N_b$, where $N_b \leq v$, where B is optimized so that $B_{opt} = \text{argmin}_B \text{trace}(R_{ee})$ subject to a selected constraint; $R_{ee}$ being the error autocorrelation function, the feedback filter is modeled by $[I_{n_i} \ 0_{n_i \times n_i N_b}] - B^*$, where $n_i$ is the number of outputs in the feedforward filter, as well as the number of outputs in the feedback filter, and the feedforward filter is modeled by W, where $W^*_{opt} = B^*_{opt} R_{xy} R_{yy}^{-1}$, $R_{xy}$ is the cross correlation between transmitted signals and signals received by said receiver, and $R_{yy}$ is the autocorrelation of the received signals.

18. The receiver of claim 17 where said selected constraint is $B^* \Phi = C^*$, where $$\Phi \equiv \begin{bmatrix} I_{n_i} & 0 & \ldots & 0 \\ 0 & I_{n_i} & \vdots & \vdots \\ \vdots & 0 & \ddots & I_{n_i} \\ 0 & \ldots & \ldots & 0 \end{bmatrix} \text{ and } C^* = [\ 0_{n_i \times n_i \Delta} \ \ I_{n_i}\ ].$$

19. The receiver of claim 17 where said selected constraint is $B^* \Phi = C^*$, where $$\Phi \equiv \begin{bmatrix} I_{n_i} & 0 & \ldots & 0 \\ 0 & I_{n_i} & \vdots & \vdots \\ \vdots & 0 & \ddots & I_{n_i} \\ 0 & \ldots & \ldots & 0 \end{bmatrix} \text{ and } C^* = [\ 0_{n_i \times n_i \Delta} \ \ B_0^*\ ],$$

$B^*_0$ being a monic lower-triangular matrix whose entries are optimized to minimize $\text{trace}(R_{ee,min})$.

20. The receiver of claim 17 where said selected constraint is $e^*_i B_0 e_i = 1$, where $e_i$ is a vector with value 1 in position i and values 0 elsewhere, and where $B^*_0$ being a monic lower-triangular matrix whose entries are optimized to minimize $\text{trace}(R_{ee,min})$.

* * * * *